United States Patent
Bao

(10) Patent No.: US 10,488,043 B2
(45) Date of Patent: Nov. 26, 2019

(54) ARC LIGHTER FIXING ELEMENT

(71) Applicant: NINGBO YANGLING TECHNOLOGY CO., LTD, Yuyao, Zhejiang (CN)

(72) Inventor: Yuyuan Bao, Zhejiang (CN)

(73) Assignee: NINGBO YANGLING TECHNOLOGY CO., LTD, Yuyao, Zhejiang (CN)

(*) Notice: Subject to any disclaimer, the term of this patent is extended or adjusted under 35 U.S.C. 154(b) by 167 days.

(21) Appl. No.: 15/863,354

(22) Filed: Jan. 5, 2018

(65) Prior Publication Data

US 2019/0154259 A1 May 23, 2019

(30) Foreign Application Priority Data

Nov. 23, 2017 (CN) .................... 2017 2 1585442 U

(51) Int. Cl.
  *F23Q 3/00* (2006.01)
  *F23Q 3/01* (2006.01)
  *F23Q 7/00* (2006.01)

(52) U.S. Cl.
  CPC ............ *F23Q 3/006* (2013.01); *F23Q 3/01* (2013.01); *F23Q 7/00* (2013.01)

(58) Field of Classification Search
  CPC ... F23Q 3/006; F23Q 3/01; F23Q 7/00; F23Q 7/001; F23Q 7/14; F23Q 7/22
  See application file for complete search history.

(56) References Cited

U.S. PATENT DOCUMENTS

| 2,727,126 | A | * | 12/1955 | Freeman | ............... | B23K 9/291 |
| | | | | | | 219/75 |
| 4,717,986 | A | * | 1/1988 | Collins, Jr. | ............. | F23Q 3/006 |
| | | | | | | 123/169 EB |
| 2002/0094500 | A1 | * | 7/2002 | Tse | ............................ | F23Q 2/16 |
| | | | | | | 431/153 |
| 2006/0121401 | A1 | * | 6/2006 | Angevine | ................ | F23Q 2/16 |
| | | | | | | 431/344 |
| 2016/0040877 | A1 | * | 2/2016 | Mohamedali | ............ | F23Q 3/01 |
| | | | | | | 431/258 |

* cited by examiner

*Primary Examiner* — Alfred Basichas
(74) *Attorney, Agent, or Firm* — Charles C. Achkar; Ostrolenk Faber LLP.

(57) ABSTRACT

An arc lighter fixing element includes a metal conduit and an arc lighter detachably installed to an end of the metal conduit. A plastic expansion member is latched into an end of the metal conduit. The arc lighter includes an arc generation head and a ceramic member installed on the top inner side of the arc generation head, and the bottom of the arc generation head is sheathed on the top of the metal conduit. A screw is passed through the center of the ceramic member and then secured with the plastic expansion member. The metal conduit may be bent conveniently to facilitate an ignition at different angles, and passed through an expansion structure to connect the arc lighter to the metal conduit, so as to facilitate the installation and disassembling.

3 Claims, 3 Drawing Sheets

ARC LIGHTER FIXING ELEMENT

CROSS REFERENCE TO RELATED APPLICATION

The present application claims priority to Chinese Application No. 201721585442.2, filed on Nov. 23, 2017, the subject matter of which is incorporated by reference in its entirety.

FIELD OF INVENTION

The present disclosure relates to the technical field of arc guns, in particular to an arc lighter fixing element.

BACKGROUND OF INVENTION

1. Description of the Related Art

In general, the structure of a conventional arc gun comprises a main body and an arc lighter mounted to the top of the main body. To provide a more flexible use of the arc gun, a metal conduit is installed between the arc lighter and the main body, and the arc lighter is fixed onto the metal conduit (by a stamping method) to forcibly stamp the arc generating component onto the metal conduit. However, the disassembly of such arc gun is troublesome.

2. Summary of the Invention

In view of the aforementioned drawback of the prior art, it is a primary objective of the present disclosure to provide an arc lighter fixing element to provide an easy disassembling.

To achieve the aforementioned and other objectives, the present disclosure provides an arc lighter fixing element comprising a metal conduit and an arc lighter detachably installed to an end of the metal conduit; and a plastic expansion member latched to an end of the metal conduit, wherein the arc lighter comprises an arc generation head and a ceramic member installed on an inner side of the top of the arc generation head, and the bottom of the arc generation head is sheathed on the top of the metal conduit, and a screw is passed through the center of the ceramic member and then secured with the plastic expansion member.

Further, the arc generation head has an insert hole formed at the bottom of the arc generation head, and a ring disposed on an inner wall of the middle of the arc generation head, and the top of the metal conduit is inserted into the insert hole, and the ring is pressed at the top of the metal conduit.

Further, the arc generation head has an accommodating hole formed at the top of the arc generation head, and the ceramic member is latched into the accommodating hole, and the ceramic member has a through hole formed at the center of the ceramic member, and a screw is passed sequentially through the through hole, the ring, and the insert hole and then secured with the plastic expansion member.

The arc lighter fixing element of this disclosure has the following beneficial effects: The metal conduit may be bent conveniently to facilitate an ignition at different angles. In addition, the plastic expansion member is latched into an end of the metal conduit, and the arc lighter includes an arc generation head and a ceramic member installed on an inner side of the top of the arc generation head, and the bottom of the arc generation head is sheathed on the top of the metal conduit, and a screw is passed through the center of the ceramic member and then secured with the plastic expansion member. In other words, an expansion structure may be used to connect the arc lighter and the metal conduit, so as to make the installation and disassembling more conveniently.

DESCRIPTION OF THE EMBODIMENTS

To understand the technical characteristics of this disclosure intuitively and comprehensively, exemplary embodiments are used and illustrated in referenced figures of the drawings. It is intended that the embodiments and figures disclosed herein are to be considered illustrative rather than restrictive.

Figure 1:
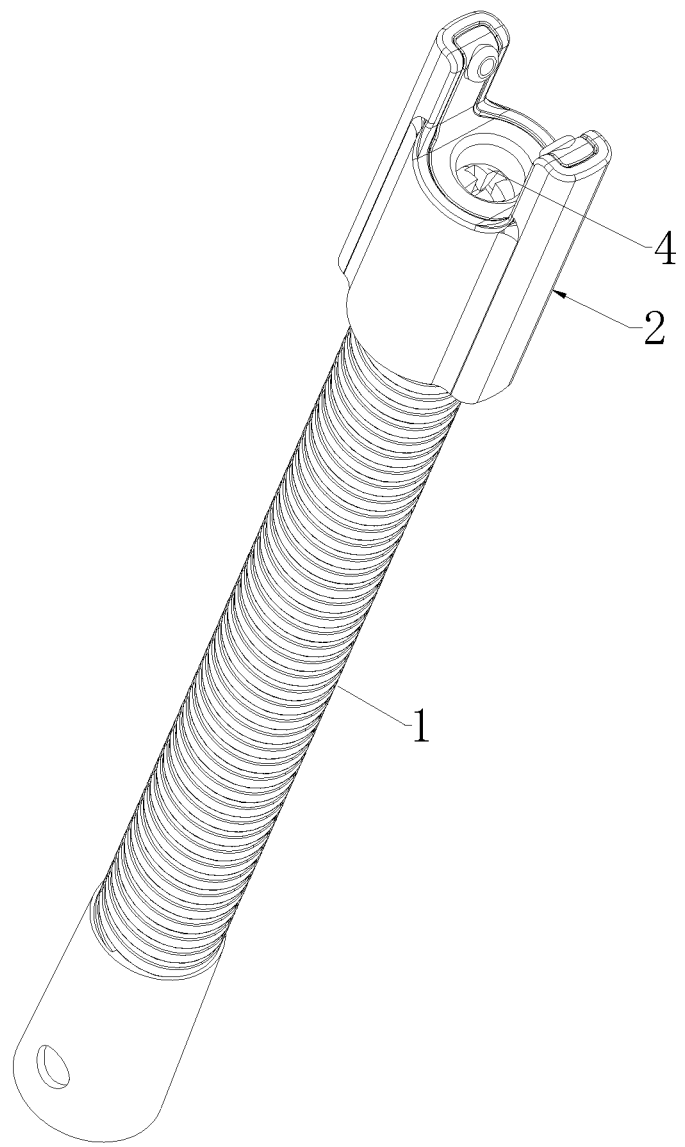
FIG. 1 is a perspective view of this disclosure.
Figure 2:
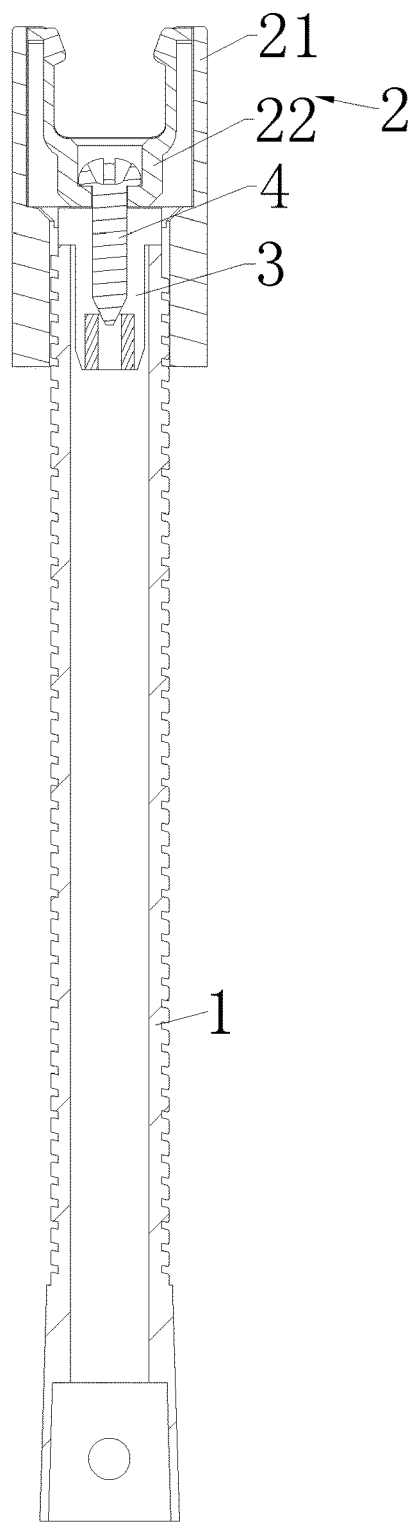
FIG. 2 is a sectional view of this disclosure.
Figure 3:
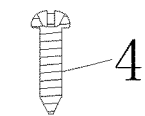
FIG. 3 is a sectional view of this disclosure after being broken down.
Figure 3:
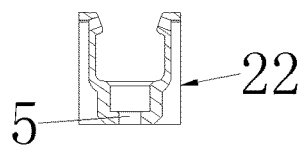
Figure 3:
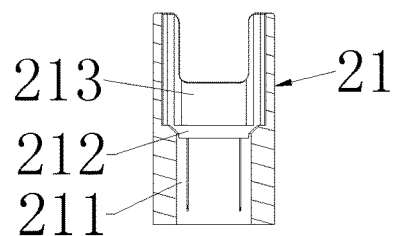
Figure 3:
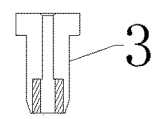
Figure 3:
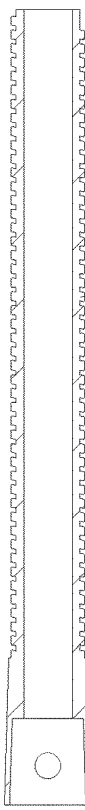

With reference to FIGS. 1 to 3 for an arc lighter fixing element of this disclosure, the arc lighter fixing element comprises a metal conduit 1 and an arc lighter 2 detachably mounted to the end of the metal conduit 1.

A plastic expansion member 3 is latched into an end of the metal conduit 1, and the arc lighter 2 comprises an arc generation head 21 and a ceramic member 22 installed to an inner side of the top of the arc generation head 21, and the bottom of the arc generation head 21 is sheathed on the top of the metal conduit 1. A screw 4 is passed through the center of the ceramic member 22 and then secured with the plastic expansion member 3.

The arc generation head 21 has an insert hole 211 formed at the bottom of the arc generation head 21, and a ring 212 is disposed on an inner wall of the middle of the arc generation head 21, and the top of the metal conduit 1 is inserted into the insert hole 211, and the ring 212 is pressed at the top of the metal conduit 1.

The arc generation head 21 has an accommodating hole 213 formed at the top of the arc generation head 21, and the ceramic member 22 is latched into the accommodating hole 213, and a through hole 5 is formed at the center of the ceramic member 22, and a screw 4 is passed sequentially through the through hole 5, the ring 212, and insert hole 211 and then secured with the plastic expansion member 3.

In the arc lighter fixing element of this disclosure, the metal conduit 1 may be bent conveniently to facilitate an ignition at different angles. Through an expansion structure, the arc lighter 2 and the metal conduit 1 are connected, so that the installation and disassembling become more convenient.

While the disclosure has been described by means of specific embodiments, numerous modifications and variations could be made thereto by those skilled in the art without departing from the scope and spirit of the disclosure set forth in the claims.

What is claimed is:
1. An arc lighter fixing element, comprising: a metal conduit, and an arc lighter detachably mounted to an end of the metal conduit;
wherein the metal conduit has a plastic expansion member latched into an end of the metal conduit, and the arc lighter comprises an arc generation head and a ceramic member installed onto the top inner side of the arc generation head, and the bottom of the arc generation head is sheathed on the top of the metal conduit, and a screw is passed through the center of the ceramic member and secured with the plastic expansion member.

2. The arc lighter fixing element of claim 1, wherein the arc generation head has an insert hole formed at the bottom of the arc generation head, and a ring disposed at the middle inner wall of arc generation head, and the top of the metal conduit is inserted into the insert hole, and the ring is pressed at the top of the metal conduit.

3. The arc lighter fixing element of claim 2, wherein the arc generation head has an accommodating hole formed at the top of the arc generation head, and a ceramic member is latched into the accommodating hole, and the ceramic member has a through hole formed at the center of the ceramic member, and a screw is passed sequentially through the through hole, the ring, and the insert hole and then secured with the plastic expansion member.

* * * * *